(12) United States Patent
Morita

(10) Patent No.: US 9,804,587 B2
(45) Date of Patent: Oct. 31, 2017

(54) PRODUCTION SYSTEM AND PROGRAM SWITCHING METHOD USED IN THE SAME

(71) Applicant: FUJI MACHINE MFG. CO., LTD., Chiryu (JP)

(72) Inventor: Yukitoshi Morita, Chiryu (JP)

(73) Assignee: FUJI MACHINE MFG. CO., LTD., Chiryu (JP)

(*) Notice: Subject to any disclaimer, the term of this patent is extended or adjusted under 35 U.S.C. 154(b) by 234 days.

(21) Appl. No.: 14/425,168

(22) PCT Filed: Sep. 21, 2012

(86) PCT No.: PCT/JP2012/074237
§ 371 (c)(1),
(2) Date: Mar. 2, 2015

(87) PCT Pub. No.: WO2014/045408
PCT Pub. Date: Mar. 27, 2014

(65) Prior Publication Data
US 2015/0220081 A1  Aug. 6, 2015

(51) Int. Cl.
*G05B 19/418* (2006.01)

(52) U.S. Cl.
CPC .. *G05B 19/41805* (2013.01); *G05B 19/41865* (2013.01); *G05B 2219/31331* (2013.01);
(Continued)

(58) Field of Classification Search
CPC .......... Y02P 90/28; Y02P 90/04; Y02P 90/14; Y02P 90/20; G05B 19/41805;
(Continued)

(56) References Cited

U.S. PATENT DOCUMENTS

| 2004/0158339 A1* | 8/2004 | Kawase | G06Q 10/087 700/97 |
| 2005/0096957 A1* | 5/2005 | Bayoumi | G06Q 10/06312 705/7.22 |

(Continued)

FOREIGN PATENT DOCUMENTS

JP  2011 249709  12/2011

OTHER PUBLICATIONS

International Search Report dated Dec. 18, 2012 in PCT/JP12/074237 Filed Sep. 21, 2012.

*Primary Examiner* — Ryan Jarrett
(74) *Attorney, Agent, or Firm* — Oblon, McClelland, Maier & Neustadt, L.L.P.

(57) ABSTRACT

A production system acquires a program list on the basis of Kanban information and switches programs of production facilities and a program switching method used in the production system are disclosed. The production system includes: program list acquisition means for acquiring a product name from a Kanban information management table and acquiring a program list corresponding to a combination of the acquired product name and a production line name from a product information management table; and program switching means for searching for a corresponding program from a program storage unit on the basis of the program list acquired by the program list acquisition means, transmitting the searched program to each production facility of a plurality of production lines, and switching the program.

8 Claims, 6 Drawing Sheets

(52) U.S. Cl.
CPC ..... *G05B 2219/31388* (2013.01); *Y02P 90/04* (2015.11); *Y02P 90/14* (2015.11); *Y02P 90/20* (2015.11); *Y02P 90/28* (2015.11)

(58) Field of Classification Search
CPC ........... G05B 2219/31331; G05B 2219/31388; G05B 19/41865
See application file for complete search history.

(56) References Cited

U.S. PATENT DOCUMENTS

| | | | | |
|---|---|---|---|---|
| 2007/0204086 | A1* | 8/2007 | Jaroszewski | H05K 13/08 710/262 |
| 2007/0288459 | A1* | 12/2007 | Kashiyama | G06F 17/30286 |
| 2011/0144786 | A1* | 6/2011 | Pearce | G06F 17/50 700/100 |

* cited by examiner

FIG. 3

```
PROGRAM LIST

1. PRODUCT AAA—LINE A, PROGRAM A1, PROGRAM B1, PROGRAMC1, PROGRAM D1
2. PRODUCT AAA—LINE B, PROGRAM A2, PROGRAM B2, PROGRAM C2
3. PRODUCT AAA—LINE C, PROGRAM A3, PROGRAM B3
4. PRODUCT AAA—LINE D, PROGRAM A4, PROGRAM B4, PROGRAM C4, PROGRAM D4
5. PRODUCT AAA—LINE E, PROGRAM A5, PROGRAM B5
6. PRODUCT BBB—LINE A, PROGRAM A6, PROGRAM B6, PROGRAM C6, PROGRAM D6
7. PRODUCT BBB—LINE B, PROGRAM A7, PROGRAM B7, PROGRAM C7
8. PRODUCT BBB—LINE C, PROGRAM A8, PROGRAM B8
9. PRODUCT BBB—LINE D, PROGRAM A9, PROGRAM B9, PROGRAM C9, PROGRAM D9
10. PRODUCT BBB—LINE E, PROGRAM A10, PROGRAM B10
11. PRODUCT CCC—LINE A, PROGRAM A11, PROGRAM B11, PROGRAM C11, PROGRAM D11
12. PRODUCT CCC—LINE B, PROGRAM A12, PROGRAM B12, PROGRAM C12
13. PRODUCT CCC—LINE C, PROGRAM A13, PROGRAM B13
14. PRODUCT CCC—LINE D, PROGRAM A14, PROGRAM B14, PROGRAM C14, PROGRAM D14
15. PRODUCT CCC—LINE E, PROGRAM A15, PROGRAM B15
                 .            .
                 .            .
                 .            .
                 .            .
                 .            .
```

PRODUCTION SYSTEM AND PROGRAM SWITCHING METHOD USED IN THE SAME

TECHNICAL FIELD

The present disclosure relates to a production system that includes a plurality of production lines with different structures and can produce products with the same type of board using the plurality of production lines and a program switching method used in the same.

BACKGROUND ART

PTL 1 discloses a board assembly and mounting line which transfers a printed circuit board, which is a production model, between a plurality of electronic component mounting apparatuses and mounts an electronic component on the printed circuit board on the basis of the production model and production model data including setup data required to produce the production model.

The board assembly and mounting line disclosed in PTL 1 includes data creation means for creating management data including a reservation list in which a series of production models is registered and production model data for the series of production models. The electronic component mounting apparatus mounts the electronic component on the basis of the created management data.

CITATION LIST

Patent Literature

PTL 1: JP-A-2011-249709

SUMMARY

In the board assembly and mounting line disclosed in PTL 1, during a production switching process, program information is automatically changed on the basis of the production reservation list and the program information of an apparatus corresponding to the type of board. In PTL 1, the program information for each type of board to be produced is not stored for each production line. Therefore, there is a concern that an error will occur when a large number of programs are switched.

The disclosure has been made in view of the above-mentioned problems and an object of the disclosure is to provide a production system that acquires a program list which is registered in advance on the basis of Kanban information and automatically switches programs of production facilities and a program switching method used in the production system.

An embodiment is directed to a production system that includes a plurality of production lines with different structures and can produce products with the same type of board using the plurality of production lines. The production system includes: a Kanban information management table in which Kanban information having a Kanban name and a product name recorded therein is registered; a program storage unit that stores a program which is executed by each production facility forming the plurality of production lines for each combination of the product name and a production line name; a product information management table in which a list of the programs is stored as a database for each combination of the product name and the production line name; program list acquisition means for acquiring the product name from the Kanban information management table and acquiring a program list corresponding to the combination of the acquired product name and the production line name from the product information management table on the basis of the combination of the acquired product name and the production line name; and program switching means for searching for a corresponding program from the program storage unit on the basis of the program list acquired by the program list acquisition means, transmitting the searched program to each production facility of the plurality of production lines, and switching the program.

An embodiment is directed to a production system, wherein a plurality of Kanban information items are generated and provided to each of the production lines, in order to produce the same product with the plurality of production lines.

An embodiment is directed to a program switching method used in a production system that includes a plurality of production lines with different structures and can produce products with the same type of board using the plurality of production lines. The program switching method may include: registering Kanban information having a Kanban name and a product name recorded therein; creating a database of a list of programs which are executed by each production facility forming the plurality of production lines for each combination of the product name and a production line name; acquiring a program list corresponding to a combination of the product name acquired from the Kanban information and the production line name, on the basis of the combination of the product name and the production line name; and searching for a corresponding program on the basis of the acquired program list, transmitting the searched program to each production facility of the plurality of production lines, and switching the program.

According to various embodiments, a program list corresponding to a combination of the Kanban information and the production line to which the Kanban information is provided can be acquired from the program lists which are registered in advance, on the basis of the combination of the Kanban information and the production line, and a plurality of programs required for each production facility of the production lines can be automatically switched on the basis of the program list. Therefore, even when a large number of programs are processed, it is possible to reliably prevent the occurrence of a program switching error.

BRIEF DESCRIPTION OF DRAWINGS

FIG. 3 is a diagram illustrating a list of programs for controlling the production system.

DETAILED DESCRIPTION OF EMBODIMENTS

Figure 1:
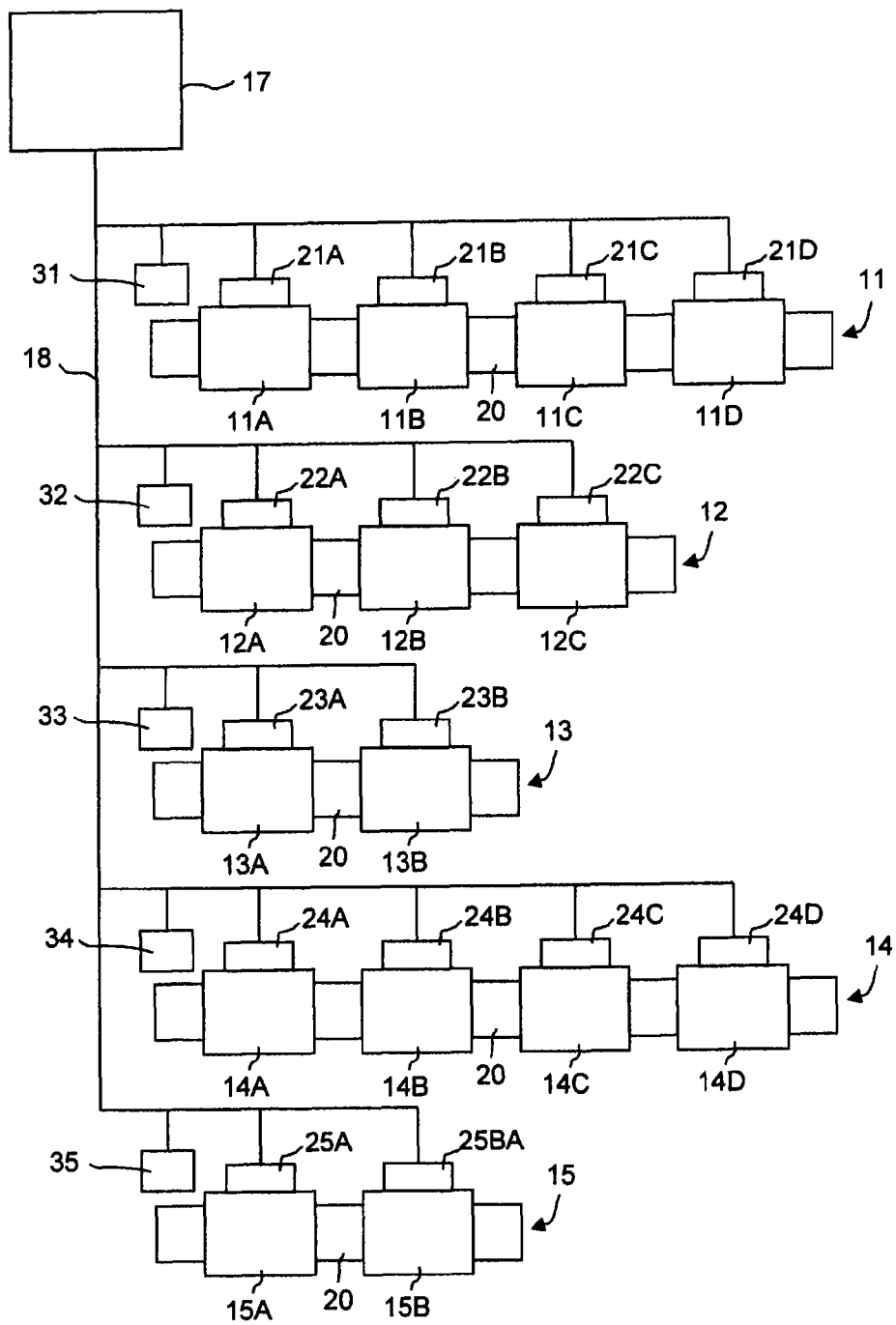
FIG. 1 is a plan view illustrating the schematic structure of a production system according to an embodiment of the invention.

Hereinafter, embodiments will be described with reference to the drawings. FIG. 1 illustrates the outline of a production system 10 which mounts an electronic component on a printed circuit board. The production system 10 includes a plurality of (in the embodiment, five lines) production lines 11, 12, 13, 14, and 15 and one management computer 17 which manages the production lines 11 to 15.

The first production line 11 includes a plurality of (in the embodiment, four) production facilities 11A to 11D to perform the work with respect to the printed circuit board such as printer, solder paste inspection machine, component mounting machine, automatic optical inspection Machine, reflow machine and a board transfer conveyor 20 which is provided on the front and rear sides of the production facilities 11A to 11D and between the production facilities 11A to 11D.

The production facilities 11A to 11D include control devices 21A to 21D, respectively. The control devices 21A to 21D are connected to the management computer 17 through a communication network 18. Data is transmitted and received between the control devices 21A to 21D and the management computer 17 by the communication network 18 such that the production facilities 11A to 11D are controlled and managed.

Each of the production facilities 11A to 11D is controlled by a program corresponding to the type of printed circuit board (product) to be provided. For example, when a printed circuit board with a product name AAA is produced, the production facilities 11A to 11D are controlled by programs A1, B1, C1, and D1, respectively.

Similarly, the second production line 12 includes a plurality of (three) production facilities 12A to 12C and a board transfer conveyor 20. The third production line 13 includes a plurality of (two) production facilities 13A and 13B and a board transfer conveyor 20. The fourth production line 14 includes a plurality of (four) production facilities 14A to 14D and a board transfer conveyor 20. The fifth production line 15 includes a plurality of (two) production facilities 15A and 15B and a board transfer conveyor 20.

The production facilities 12A to 12C, 13A, 13B, 14A to 14D, 15A, and 15B are provided with control devices 22A to 22C, 23A, 23B, 24A to 24D, 25A, and 25B, respectively. The control devices are connected to the management computer 17 through the communication network 18.

The production lines 11 to 15 are configured so as to produce products (printed circuit boards) with the same type of boards and products with different types of boards. When the products with the same type of boards are produced by a plurality of production lines 11 to 15 with different structures, the four production facilities 11A to 11D of the first production line 11 are controlled by the programs A1 to D1, respectively, and the production facilities of the other production lines 12 to 15 are controlled by programs other than the programs A1 to D1, respectively.

When products with different types of boards are produced by a plurality of production lines 11 to 15, the production facilities of the production lines 11 to 15 are controlled by different programs.

A plurality of programs corresponding to combinations of the types of products and the production lines 11 to 15 for producing the products are created in advance. The programs are stored in a program storage unit 17a (see FIG. 2) of the management computer 17.

Figure 2:
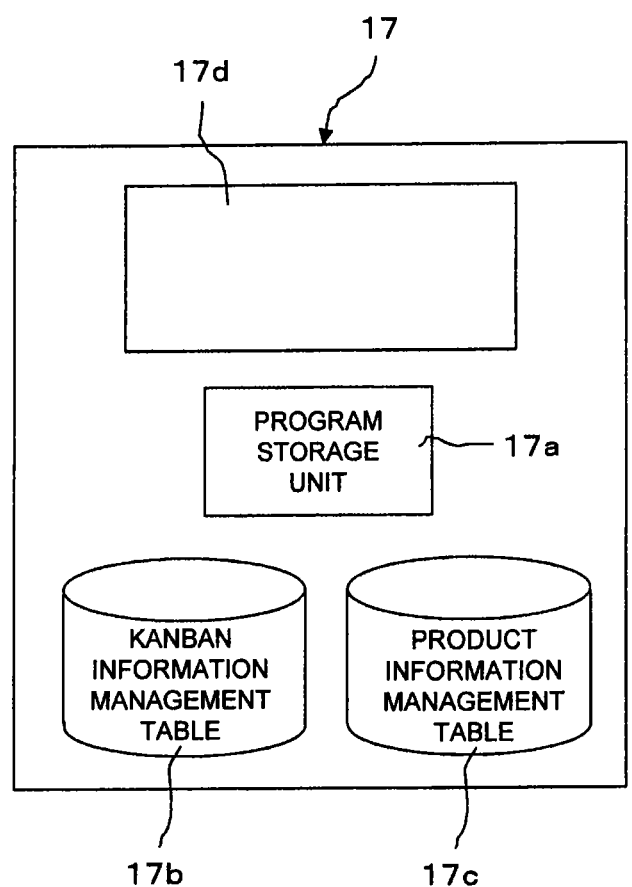
FIG. 2 is a block diagram illustrating the schematic structure of a management computer.

As illustrated in FIG. 2, the management computer 17 includes a Kanban information management table 17b which manages Kanban information and a product information management table 17c which manages product information, in order to acquire a necessary program from the programs stored in the program storage unit 17a. In addition, the management computer 17 includes a display device 17d and necessary information is input and output through the display device 17d.

A database of a program list is stored in the product information management table 17c. The program list is a database in which program information required for combinations of product names (AAA, BBB, CCC, . . . ) and line names (A, B, C, . . . ) is associated with each of the combinations, as illustrated in FIG. 3. For example, "product AAA-line A, program A1, program B1, program C1, program D1" in the first line of the program list means the link of the programs A1 to D1 for the production facilities 11A to 11D which are required for the first production line 11 with a line name A to produce a printed circuit board with a product name AAA.

In addition, "product AAA-line B, program A2, program B2, program C2" means the link of the programs A2 to C2 for the production facilities 12A to 12C which are required for the second production line 12 with a line name B to produce the printed circuit board with the product name AAA. "Product AAA-line C, program A3, program B3" means the link of the programs A3 and B3 for the production facilities 13A and 13B which are required for the third production line 13 with a line name C to produce the printed circuit board with the product name AAA.

Similarly, "product AAA-line D, program A4, program B4, program C4, program D4" means the link of the programs A4 to D4 for the production facilities 14A to 14D which are required for the fourth production line 14 with a line name D to produce the printed circuit board with the product name AAA. "Product AAA-line E, program A5, program B5" means the link of the programs A5 and B5 for the production facilities 15A and 15B which are required for the fifth production line 15 with a line name E to produce the printed circuit board with the product name AAA.

In this way, it is possible to acquire the program list required for each production facility on the basis of the product name and the line name.

A plurality of programs stored in the program storage unit 17a includes work data related to an operation for mounting an electronic component on the printed circuit board, that is, data for the mounting position of the electronic component represented by the coordinate system of the printed circuit board or the mounting angle of the electronic component and the type of electronic component.

Figure 4:
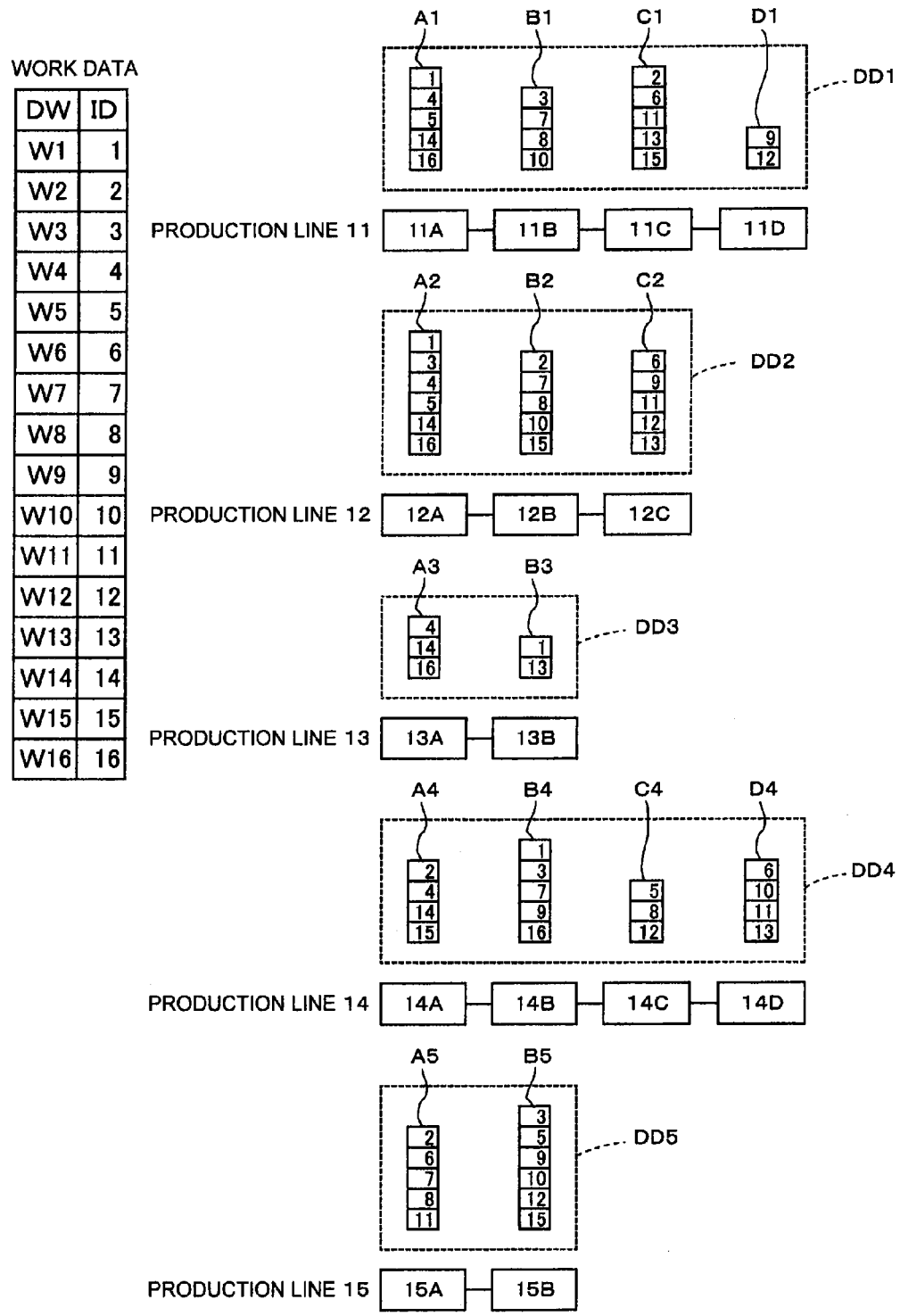
FIG. 4 is a diagram illustrating the data configuration of the program stored in the management computer.

Specifically, as illustrated in FIG. 4, the work data has a data structure in which identifier IDs (in this example, ID=numbers 1 to 16) for identifying each sequence data item DW are added to the sequence data DW (in this example, DW=16 data items W1 to W16) for mounting plural types of electronic components on the same type of printed circuit board. The sequence data DW includes a mounting position (X, Y) of the electronic component in the XY orthogonal coordinate system of the printed circuit board, a mounting angle θ of the electronic component, and the type (name) of electronic component. The mounting angle θ is a predetermined angle including 0 degrees which is set by the electronic component. The work data is created for each type of printed circuit board.

When the electronic component is mounted on the printed circuit board on the basis of the work data, a camera (not illustrated) captures an image of the electronic component which is sucked by a suction nozzle of a component mounting machine and the electronic component is rotated with reference to the mounting angle θ of the electronic component in the work data such that a suction angle is equal to the mounting angle, if necessary. Then, the mounting position (X, Y) of the electronic component in the XY orthogonal coordinate system of the printed circuit board which is included in the work data is converted into a position in the coordinate system of the component mounting machine. The electronic component is moved onto the printed circuit board which is located at a predetermined position and is mounted at the coordinate-converted component mounting position. The above-mentioned operation is repeated the number of times corresponding to the number of electronic components to be mounted.

As described above, the mounting position (X, Y) of the electronic component in the XY orthogonal coordinate system of the printed circuit board is stored as the work data. Therefore, it is not necessary to store the mounting position of the electronic component which is represented by the coordinate system of each of the plurality of production facilities 11A to 15B. For example, the sequence data items W1, W4, W5, W14, and W16 corresponding to the identifiers 1, 4, 5, 14, and 16 are transmitted to the control device 21A of the production facility 11A in the production line 11. Therefore, the mounting position (X, Y) of the electronic component in the XY orthogonal coordinate system of the printed circuit board which is stored in each of the sequence data items W1, W4, W5, W14, and W16 may be converted into a position in the coordinate system of the production facility 11A. In this case, it is possible to manage the manufacture of boards by a plurality of production lines 11 to 15 with a small amount of data.

The work data is allocated to data groups for the production facilities 11A to 15B on the basis of configuration data. The data groups include the identifier IDs for identifying each sequence data item DW of the work data. The data groups are analyzed with reference to the data forming the data groups such that the component mounting operation times of the production facilities 11A to 15B in each of the production lines 11 to 15, which manufacture component-mounted boards obtained by mounting plural types of electronic components on the same type of printed circuit boards, are equal to each other and each sequence data item DW is allocated to the production lines 11 to 15. Then, the identifier IDs corresponding to each of the allocated sequence data items DW are arranged for each of the production facilities 11A to 15B to create identifier ID groups. In addition, the identifier ID groups are aggregated for each of the production lines 11 to 15 to create each data group.

Specifically, as illustrated in FIG. 4, the program items A1 to D1 for respectively controlling the production facilities 11A to 11D of the production line 11 form a data configuration DD1 which is a set of an identifier ID group [1, 4, 5, 14, 16] for the production facility 11A, an identifier ID group [3, 7, 8, 10] for the production facility 11B, an identifier ID group [2, 6, 11, 13, 15] for the production facility 11C, and an identifier ID group [9, 12] for the production facility 11D. Similarly, the program items A2 to C2 for respectively controlling the production facilities 12A to 12C of the production line 12 form a data configuration DD2 which is a set of an identifier ID group [1, 3, 4, 5, 14, 16] for the production facility 12A, an identifier ID group [2, 7, 8, 10, 15] for the production facility 12B, and an identifier ID group [6, 9, 11, 12, 13] for the production facility 12C. The program items A3 and B3 for respectively controlling the production facilities 13A and 13B of the production line 13 form a data configuration DD3 which is a set of an identifier ID group [4, 14, 16] for the production facility 13A and an identifier ID group [1, 13] for the production facility 13B. The program items A4 to D4 for respectively controlling the production facilities 14A to 14D of the production line 14 form a data configuration DD4 which is a set of identifier ID groups [2, 4, 14, 15], [1, 3, 7, 9, 16], [5, 8, 12], and [6, 10, 11, 13] for the production facilities 14A to 14D. The program items A5 and B5 for respectively controlling the production facilities 15A and 15B of the production line 15 form a data configuration DD5 which is a set of identifier ID groups [2, 6, 7, 8, 11] and [3, 5, 9, 10, 12, 15] for the production facilities 15A and 15B.

The Kanban information managed by the Kanban information management table 17b corresponds to a production instruction in which information required for each of the production lines 11 to 15 to produce products is written, as well known in "Kanban" which is the Toyota production system, and is created during production planning. The Kanban information managed by the Kanban information management table 17b and the product information managed by the product information management table 17c are independently managed.

Figure 5:
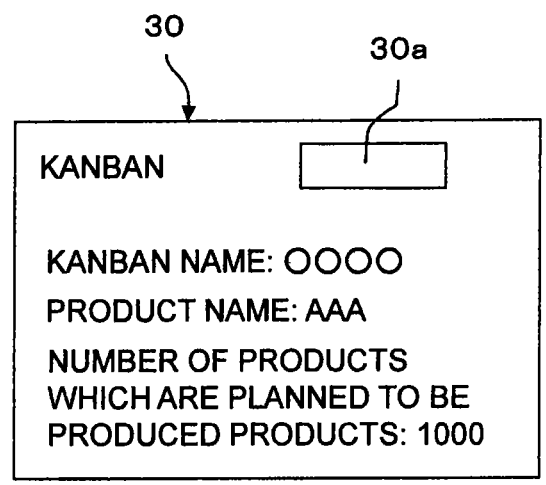
FIG. 5 is a diagram illustrating Kanban.

As illustrated in FIG. 5, an ID 30a, such as a bar code indicating a Kanban name, a product name, the number of products to be produced, and a delivery date and time are written on a Kanban 30 having the Kanban information written thereon. When the Kanban 30 is provided to each of the production lines 11 to 15, for example, bar code readers of input devices 31 to 35 (see FIG. 1) which are respectively provided in the production lines 11 to 15 read the ID 30a of the Kanban 30. The ID 30a of the Kanban 30 is input to the management computer through the communication network 18. The Kanban information (for example, a Kanban name and a product name) corresponding to the ID 30a is acquired by the Kanban information management table 17b.

When a predetermined number of products indicated by the Kanban 30 are produced by the plurality of production lines 11 to 15, a plurality of Kanbans 30 required for the plurality of production lines 11 to 15 to produce the products are created. In this case, when the products are produced by a plurality of production lines, the cycle time required for a predetermined program to produce the products in each production line is calculated. The number of production lines most suitable to produce the indicated number of products until a predetermined delivery date is selected, considering the cycle time or the operation state of each production line.

For example, when 1000 products with a product name AAA are produced, a new production plan is made which produces 500 products with the first production line 11, produces 300 products with the second production line 12, and produces 200 products with the third production line 13 and three Kanbans 30 are generated.

The Kanbans 30 are provided to the first to third production lines 11 to 13 and the IDs 30a of the Kanbans 30 are read by the ID readers provided in the input devices 31 to 33 of the production lines 11 to 13. The read Kanban IDs 30a are input to the management computer 17 through the communication network 18 and the product name AAA indicated by the Kanban 30 is recognized by the Kanban information management table 17b. At the same time, the line names A, B, and C of the production lines 11 to 13 are input by the input devices 31 to 33. The line name may be automatically input when the Kanban ID 30a is read.

A program list corresponding to a combination (product AAA-line A) of the product name (AAA) and the line name (A) is acquired by the product information management table 17c on the basis of the combination. A plurality of programs (A1, B1, C1, and C2) linked to the combination of the product name (AAA) and the line name (A) are searched from the program storage unit 17a on the basis of the acquired program list. The management computer 17 transmits each of the searched programs to the control devices 21A to 21D of the production facilities 11A to 11D in the first production line 11 through the communication network 18 and the programs of the production facilities 11A to 11D are switched.

Similarly, program lists corresponding to a combination of the product name (AAA) and the line name (B) and a combination of the product name (AAA) and the line name (C) are acquired from the product information management table 17c on the basis of the combinations and the programs of the production facilities 12A to 12C of the second production line 12 and the production facilities 13A and 13B of the third production line 13 are switched.

Figure 6:
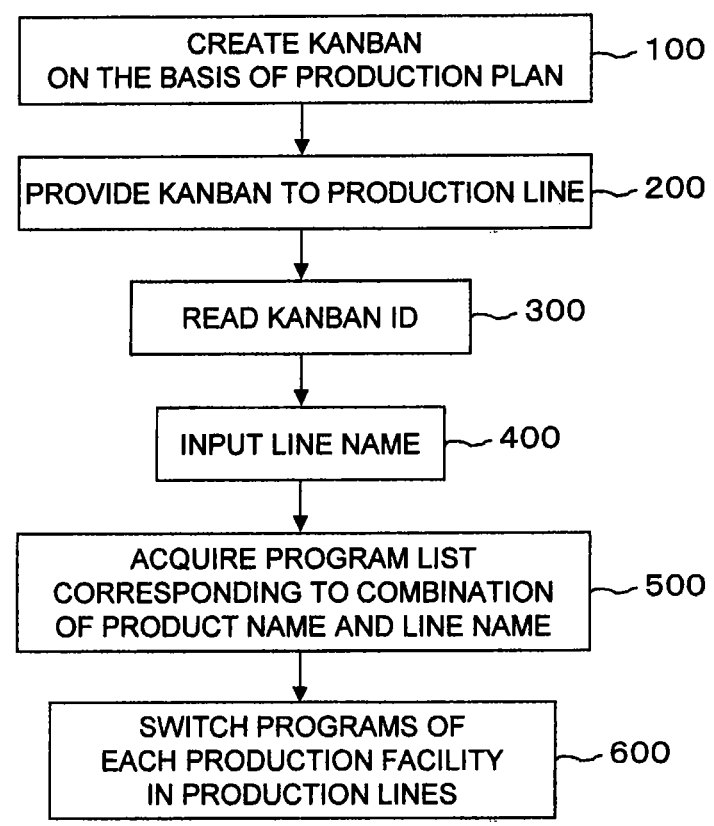
FIG. 6 is a diagram illustrating a step of switching the programs of each production facility in the production system.

Next, a process of managing the program information on the basis of the Kanban information will be described with reference to a step diagram of FIG. 6. Hereinafter, an example in which the product (printed circuit board) with the product name AAA is produced by three production lines 11, 12, and 13 with the line names A, B, and C will be described.

First, in Step 100, three Kanbans 30 are generated on the basis of the production plan and the three generated Kanbans 30 are provided to the first to third production lines 11 to 13, respectively (Step 200). In Step 300, the input devices 31 to 33 provided in the production lines 11 to 13 read the IDs 30a of the Kanbans 30 which are provided to the production lines 11 to 13, the product name AAA is recognized on the basis of the Kanban information management table 17b of the management computer 17, and the line names A, B, and C of the production lines 11 to 13 are input (Step 400). In this way, combinations (product AAA-line A, product AAA-line B, product AAA-line C) of the product name (AAA) and the line names (A, B, and C) are formed.

Then, in Step 500, the program list corresponding to the combination of the product name (AAA) and the line name (A) is searched for from the product information management table 17c on the basis of the combination and is then acquired. A plurality of programs (programs A1 to D1) linked to the acquired program list are searched from the program storage unit 17a on the basis of the acquired program list. Then, in Step 600, the management computer 17 collectively transmits the programs A1 to D1 which are searched from the program storage unit 17a to the control devices 21A to 21D of the production facilities 11A to 11D in the first production line 11 through the communication network 18, respectively, and the programs of the production facilities 11A to 11D are switched.

Similarly, the program lists corresponding to a combination of the product name (AAA) and the line name (B) and a combination of the product name (AAA) and the line name (C) are acquired from the product information management table 17c on the basis of the combinations. A plurality of programs (the programs A2 to C2 and the programs A3 and B3) linked to the acquired program lists are searched from the program storage unit 17a on the basis of the acquired program lists. The management computer 17 transmits the programs to the control devices 22A to 22C of the production facilities 12A to 12C in the second production line 12 and the control devices 23A and 23B of the production facilities 13A and 13B in the third production line 13, respectively. The programs of the production facilities 12A to 12C and the production facilities 13A and 13B are switched.

Program list acquisition means for acquiring the program list from the product information management table 17c is formed by Step 500 and program switching means for switching the programs of the production facilities in the production lines is formed by Step 600.

As such, a necessary program list can be acquired from the program lists which are registered in advance on the basis of a combination of the Kanban information and the production line to which the Kanban information is provided and a plurality of programs required for each production facility in the production line can be automatically switched on the basis of the program list. Therefore, it is possible to reliably prevent the occurrence of a program switching error.

The Kanban information registered in the Kanban information management table 17b and the product information registered in the product information management table 17c are independently managed. Therefore, when the program list included in the product information is changed, the Kanban information is not affected by the change in the program list. The product information of the same product varies depending on the structure of the production line. Since the product information is created for each production line to which the Kanban is provided, the Kanban information is not affected by the product information and it is possible to flexibly respond to a change in the production line to which the product is provided or a change in the program of the production facility in each production line.

When the program stored in the program storage unit 17a is corrected, it is preferable to change the program name to respond to the correction of the program. This is because it is possible to leave the content of the program in the previous production process or the change in the program name is advantageous when the program returns to the original program after the program is temporarily changed.

In the above-described embodiment, the Kanbans 30 are used to manage the production of products by the production lines 11 to 15. Therefore, it is possible to perform progress management on the basis of the number of Kanbans 30 which are currently produced.

In the above-described embodiment, each of the production lines 11 to 15 uses one board transfer lane (board transfer conveyor 20). However, various embodiments may also respond to a structure in which each production line is provided with double lanes or triple lanes. For example, in a production line provided with double lanes including lane 1 which transfers a product AAA and lane 2 which transfers a product BBB, a database of the program lists is created on the basis of a combination of a product name, a production line name, and a lane name, which makes it possible to manage program information with the same method as that in the above-described embodiment.

That is, an electronic component may be mounted on a printed circuit board which is transferred through lane 1 by the program for the product AAA and an electronic component may be mounted on a printed circuit board which is transferred through lane 2 by the program for the product BBB.

According to the production system 10 and the program switching method used in the production system 10 of the above-described embodiment, a program list corresponding to combinations of the Kanban information and the production lines 11 to 15 to which the Kanban information is provided can be acquired from the program lists which are registered in advance, on the basis of the combinations, and the programs of the production facilities 11A to 15B in the production lines 11 to 15 can be collectively switched on the basis of the acquired program list. Therefore, it is possible to prevent the occurrence of a program switching error and to accurately switch a large number of programs, as compared to the structure in which the programs are switched one by one.

In addition, the Kanban information registered in the Kanban information management table 17b and the product information which is stored as a database in the product information management table 17c are independently managed. Therefore, even when the program name included in the product information is changed, the Kanban information is not affected by the change in the program name and it is possible to flexibly respond to a change in the production line to which the product is provided or the program name.

The production system and the production method according to some embodiments have been described above. However, the invention is not limited to the structure described in the embodiments and various modifications and changes can be made without departing from the scope and spirit of the invention described in the claims.

INDUSTRIAL APPLICABILITY

The production system and the program switching method used in the production system according to the various embodiments are useful for a case in which a plurality of production lines with different configurations produce products with the same type of board.

REFERENCE SIGNS LIST

10: PRODUCTION SYSTEM, 11 TO 15: PRODUCTION LINE, 11A TO 11D, 12A TO 12C, 13A, 13B, 14A TO 14D, 15A, 15B: PRODUCTION FACILITY, 17: MANAGEMENT COMPUTER, 17a: PROGRAM STORAGE UNIT, 17b: KANBAN INFORMATION MANAGEMENT TABLE, 17c: PRODUCT INFORMATION MANAGEMENT TABLE, 21A to 21D, 22A to 22C, 23A, 23B, 24A to 24D, 25A, 25B: CONTROL DEVICE, 30: KANBAN, 30a: KANBAN ID, 31 TO 35: INPUT DEVICE, STEP 500: PROGRAM LIST ACQUISITION MEANS, STEP 600: PROGRAM SWITCHING MEANS

The invention claimed is:

1. A production system that includes a plurality of production lines with different structures and can produce products with the same type of board using the plurality of production lines, each production line including a plurality of production facilities, the production system comprising:
a program storage device that stores at least one program which is executed by each production facility to produce the products;
a readable display board information management table in which readable display board information having a readable display board name and a product name recorded therein is registered;
a product information management table in which a program list is stored as a database for each combination of the product name and a production line name; and
processing circuitry configured to:
acquire the product name from the readable display board information management table and acquire a program list corresponding to the combination of the acquired product name and the production line name from the product information management table; and
search for a corresponding program from the program storage device based on the acquired program list, transmit the searched program to each production facility of the plurality of production lines, and switch a preexisting program of each production facility of the plurality of production lines with the searched program.

2. The production system according to claim 1, wherein a plurality of readable display board information items are generated and provided to each of the production lines, in order to produce the same product with the plurality of production lines.

3. The production system according to claim 1, wherein a plurality of the programs are collectively transmitted and switched based on the acquired program list.

4. The production system according to claim 1, wherein the plurality of programs include work include data related to an operation to mount a component on a printed circuit board.

5. A program switching method used in a production system that includes a plurality of production lines with different structures and can produce products with the same type of board using the plurality of production lines, each production line including a plurality of production facilities, comprising:
storing at least one program which is executed by each production facility to produce the products;
registering readable display board information having a readable display board name and a product name recorded therein;
creating a database of a program list, which is executed by each production facility forming the plurality of production lines, for each combination of the product name and a production line name;
acquiring a program list corresponding to a combination of the product name acquired from the readable display board information and the production line name based on the combination of the product name and the production line name; and
searching for a corresponding program based on the acquired program list, transmitting the searched program to each production facility of the plurality of production lines, and switching a preexisting program of each production facility of the plurality of production lines with the searched program.

6. The program switching method according to claim 5, wherein a plurality of the programs are collectively transmitted and switched based on the acquired program list.

7. The program switching method according to claim 5, wherein a plurality of readable display board information items are generated and provided to each of the production lines, in order to produce the same product with the plurality of production lines.

8. The program switching method according to claim 5, wherein the plurality of programs include work include data related to an operation to mount a component on a printed circuit board.

* * * * *